United States Patent
Schindler et al.

(10) Patent No.: US 8,762,000 B2
(45) Date of Patent: Jun. 24, 2014

(54) METHOD AND DEVICE FOR OPERATING A CHASSIS

(71) Applicant: Audi AG, Ingolstadt (DE)

(72) Inventors: Andrease Schindler, Ingolstadt (DE); Christoph Göhrle, Ingolstadt (DE); Oliver Sawodny, Stuttgart (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/958,055

(22) Filed: Aug. 2, 2013

(65) Prior Publication Data

US 2014/0039758 A1 Feb. 6, 2014

(30) Foreign Application Priority Data

Aug. 4, 2012 (DE) .......................... 10 2012 015 492

(51) Int. Cl.
*B60G 23/00* (2006.01)
*B60G 17/018* (2006.01)
*B60T 8/1755* (2006.01)

(52) U.S. Cl.
CPC .......... *B60G 17/018* (2013.01); *B60G 2500/10* (2013.01); *B60T 8/1755* (2013.01); *B60G 2400/252* (2013.01)
USPC ................... 701/37; 701/23; 701/36; 701/41; 701/70; 701/82; 701/301; 701/409; 701/508; 701/532; 318/568.12; 318/568.16; 340/435; 340/904

(58) Field of Classification Search
CPC ........... B60G 2400/102; B60G 17/018; B60G 500/10; B60G 2400/252; B60T 8/1755
USPC ......... 701/2, 23, 25, 36, 41, 70, 82, 301, 409, 701/508, 532; 318/568.12, 568.16; 446/454, 456, 470; 180/169, 167, 43; 345/474, 958; 340/904, 435; 342/56
See application file for complete search history.

(56) References Cited

U.S. PATENT DOCUMENTS 5,199,737 A * 4/1993 Huang ........................ 280/5.512
5,439,245 A * 8/1995 Breitenbacher et al. ... 280/5.518
(Continued)

FOREIGN PATENT DOCUMENTS

| DE | 103 44 053 | 4/2004 |
|----|-----------|--------|
| DE | 102008061696 | 6/2010 |
| DE | 102009057397 | 9/2010 |
| DE | 102010013178 | 12/2010 |
| DE | 102010018902 | 11/2011 |
| DE | 102010044263 | 3/2012 |

OTHER PUBLICATIONS

13958055_20140204_Gavrila et al. Real Time Vision for Intelligen Vehicles, 2001, IEEE, p. 22-27.*

Huang et al., The intelligent embedded control warning system for car reversing, 2011, IEEE, p. 849-852.*

Sugimoto et al., Obstacle Detection Using Millimeter-wave Radar and Its Visualization on Image Sequ, 2004, IEEE, p. 1-4.*

*Primary Examiner* — McDieunel Marc
(74) *Attorney, Agent, or Firm* — Henry M. Feiereisen LLC

(57) ABSTRACT

In a method for operating an at least semi-active chassis of a vehicle, a height profile of a road course which lies ahead in driving direction of the vehicle is determined with at least one sensor unit and at least one actuating unit of the vehicle is proactively controlled with the control unit, wherein an actual obstacle of the road course, which is displayed in the determined height profile is assigned to one of multiple predefined and store categories and a predetermined control signal is transmitted to the at least actuating unit based on the assigned category, wherein the actuating unit executes the control signal.

15 Claims, 1 Drawing Sheet

(56) References Cited

U.S. PATENT DOCUMENTS

| | | | |
|---|---|---|---|
| 5,450,322 A | 9/1995 | Tanaka et al. | |
| 5,550,739 A * | 8/1996 | Hoffmann et al. | 701/37 |
| 6,082,715 A * | 7/2000 | Vandermolen | 267/131 |
| 6,233,510 B1 | 5/2001 | Platner et al. | |
| 8,204,634 B2 * | 6/2012 | Schwarz et al. | 701/1 |
| 2004/0046335 A1 | 3/2004 | Knox et al. | |
| 2004/0094912 A1 | 5/2004 | Niwa et al. | |
| 2008/0015743 A1 * | 1/2008 | Haug | 701/1 |
| 2010/0152969 A1 | 6/2010 | Li et al. | |
| 2013/0103259 A1 * | 4/2013 | Eng et al. | 701/37 |

* cited by examiner

METHOD AND DEVICE FOR OPERATING A CHASSIS

CROSS-REFERENCES TO RELATED APPLICATIONS

This application claims the priority of German Patent Application, Serial No. 10 2012 015 492.5, filed Aug. 4, 2012, pursuant to 35 U.S.C. 119(a)-(d), the disclosure of which is incorporated herein by reference.

BACKGROUND OF THE INVENTION

The present invention relates to a method and a device for operating an at least semi-active chassis of a motor vehicle.

The following discussion of related art is provided to assist the reader in understanding the advantages of the invention, and is not to be construed as an admission that this related art is prior art to this invention.

With increasing wealth and higher living standards comes on one hand a demand for comfort and on the other hand an increased desire for protection and safety. In the context of motor vehicles, these desires have strongly influenced motor vehicle development, in particular the field of chassis and vehicle control systems. The goal of active chassis and the associated vehicle control systems is to increase agility, driving dynamic, comfort and safety compared to passive chassis.

Measuring a height profile of a road ahead of the vehicle via a vehicle sensor system and transmitting the height profile to a chassis control enables better control strategies to increase comfort, driving safety and driving dynamic, and to lower energy consumption.

From the state-of-the-art a forward-looking chassis is generally known which includes a sensor for recognizing a height profile of a road ahead of the vehicle, and active elements, which can be adjusted to the height profile to thereby increase driving comfort.

However, none of the prior art publications discloses how precisely to drive over an obstacle such as a pothole by controlling the vehicle, for example by lifting the wheels. This means, that to date a concrete and fast control of an actuating system that is present in the motor vehicle and is responsible for the driving behavior to further increase driving comfort and driving dynamic, is not known.

It would therefore be desirable and advantageous to provide a possibility to control an actuating system in the chassis so that even before driving over an obstacle this obstacle is recognized and appropriate measures are taken in response prior to reaching this obstacle.

SUMMARY OF THE INVENTION

According to one aspect of the present invention a method for operating an at least semi-active chassis of a vehicle, includes determining with a sensor unit a height-profile of a road course which in driving direction of the vehicle lies ahead of the vehicle, and proactively controlling with a control unit the at least one actuating unit of the vehicle as a function of the determined height-profile. This involves assigning an actual obstacle of the road which obstacle is displayed in the determined height profile to one of multiple predefined and stored categories based on a geometric shape of the actual obstacle and transmitting to the at least one actuating unit a predetermined control signal on the basis of the assigned category. The actuating unit eventually correspondingly executes the control signal.

According to another advantageous feature of the invention, the chassis can be a fully active chassis.

According to another advantageous feature of the invention the method includes, classifying beforehand a selection of potential obstacles that may be encountered on a driving course as a function of their respective geometrical shape and generating the multiple categories based on this classification. These multiple categories are generally stored in an appropriate memory unit in the vehicle and can then be retrieved. Beforehand means in the broadest sense "before driving of the motor vehicle over the road course".

According to another advantageous feature of the invention, the method includes assigning to each of the multiple categories a respective control signal as predetermined control signal, wherein the respective predetermined control signal is calculated as a function of the potential obstacles that may be encountered on the driving course and which are classified in the respective category.

According to another advantageous feature of the invention, the predetermined control signal can be adjusted to the geometric shape of the actual obstacle in real time, which means when driving over the road course and approaching the actual obstacle.

According to another aspect of the present invention, a method for operating an at least semi-active chassis of a vehicle, includes the steps of determining with at least one sensor unit a height-profile of a road course which lies ahead in a driving direction of the vehicle; predefining multiple categories representative of respective potential obstacles that may be present on the road course as a function of respective geometric shapes of the potential obstacles, and storing the multiple categories; assigning an actual obstacle of the road course which is displayed in the height profile to one of the multiple predefined and stored categories as a function of a geometric shape of the actual obstacle; and proactively controlling with a control unit at least one actuating unit of the motor vehicle by transmitting to the at least one actuating unit a predetermined control signal assigned to the one of the multiple categories, thereby causing actuation of the actuating unit commensurate with the predetermined control signal, wherein the predetermined control signal is calculated as a function of the respective potential obstacles of the predefined categories.

According to another advantageous feature of the invention, the chassis can be displayed in a virtual vehicle model and an effect of the control of the actuator by the control signal on the vehicle when driving over the recognized actual obstacle is simulated and in response thereto the actuator control is modified in such a manner that at least one pre-determinable criterion is satisfied. This means that by way of the simulation or the results of the simulation, optimal actuating variables are calculated in order to optimally compensate the actual obstacle.

According to another advantageous feature of the invention, the at least one actuator unit can be selected from the group consisting of a spring mount adjustment, adjustable dampers, and a path adjustment between wheel and superstructure and combinations thereof.

The method according to the invention allows to better control the at least one actuator unit or generally the actuator system of the motor vehicle in order to further improve driving comfort and driving dynamic. This is enabled by a proactive control of the actuating system, which is responsible for the driving behavior, which means a control even before driving over the obstacle. Thus, when determining a pothole on one side, first a relieving or lifting one front wheel of the motor vehicle and thereafter a rear wheel of the motor vehicle is enabled before reaching the pothole in order to not perceive the pothole. The method according to the invention makes it possible to proactively vertically retract the wheels of the motor vehicle, preferably with a maximally possible adjustment speed so that the wheels are retracted even before for example reaching a bump. After this, the wheels are automatically extended again. In this context it should be noted that on one hand, the adjustment speed of the actuating system for the at least one actuator is limited and also that the actuator dynamic i.e., the time until the actuator is capable to execute a target signal also has to be taken into account. When driving over a higher bump, such as for example a so called hump it should be noted that the adjustment path of the actuating system is mechanically limited. If a bump is higher than can be compensated by the possible adjustment path, the vehicle is initially lifted vertically as a whole as soon as the obstacle is recognized by the sensor system. As a result, an increased adjustment path of the actuating system is subsequently available in order to vertically retract the wheels, which enables better compensation of the obstacle.

In the above mentioned scenarios the classification i.e., categorization of potential obstacles that may be encountered on the driving course into categories enables appropriately controlling the actuating system in a forward-looking manner i.e., before reaching the obstacle. The classification into categories is based on a geometric shape of the respective obstacle. The obstacle can for example be a pothole, in particular a pothole on one side of the road, a bump, a high bump and so on. When an obstacle is detected on the road or road course lying ahead by a sensor unit, which is provided for this purpose, it is tested according to the invention into which of the predefined categories the detected actual obstacle fits. Then a previously calculated control signal for the actual obstacle, which control signal is assigned to the respective category and which corresponds to a respective type of obstacle of the respective category is transmitted to the at least one actuating unit in order to optimally compensate the obstacle and to thereby improve the driving comfort and the driving dynamic as much as possible. In the case of a pothole this can mean a proactive one-sided lifting of the wheel or in the case of the bump, which is positioned centered, a proactive retraction of both wheels. The previously calculated control signal, which is assigned to a respective category can further be optimized i.e. adjusted by way of the exact geometry of the actual obstacle.

The adjustment of the already previously calculated control signal to the actual obstacle or its exact geometry is carried out for example by means of a so-called online-optimization.

According to another aspect of the present invention, a device for operating an at least semi-active chassis of a vehicle includes at least one sensor unit which is configured to determine a height profile of a driving course which in driving direction of the vehicle lies ahead of the vehicle and to transmit the height profile to a control unit, which is configured to proactively control at least one actuating unit of the vehicle on the basis of the determined height profile, wherein an actual obstacle of the course which is displayed in the determined height-profile is assigned to one of multiple predefined and stored categories based on a geometric shape of the actual obstacle and based on the assigned category, and a predetermined control signal is transmitted to the at least one actuating unit.

According to another advantageous feature of the invention, the device further includes the at least one actuating unit which is coupled with the control unit and configured to execute the control signal that was transmitted by the control unit.

According to another advantageous feature of the invention, the chassis can be a fully active chassis.

The device according to the invention can further include a classification module that is coupled with the control unit and is configured to classify a selection of potentially occurring obstacles on a driving course beforehand based on their respective geometric shape, and from this establish the multiple categories.

The classification module can further be configured to assign each of the plurality of the categories one control signal as predetermined control signal, wherein the respective predetermined control signal can be calculated on the basis of the obstacles classified into the respective category.

According to another advantageous feature of the invention, the device can further include a calculating unit, which is coupled with the control unit and is configured to display the chassis in a virtual vehicle model and to simulate an effect of the control of the actuator by the control signal on the vehicle when driving over the actual obstacle and in response thereto to modify the control of the actuator in such a manner that at least one predeterminable criteria is satisfied. For this, based on a virtual vehicle model, an effect of the control signal on the vehicle body and wheel movement is determined when driving over the actual recognized obstacle and actuating values calculated by means of an optimization such that the criteria is optimally satisfied, for example a minimal acceleration of the vehicle body in order to maximize the comfort.

According to another advantageous feature of the invention, the classification module can be part of the control unit. Further, the calculating unit can also be part of the control unit.

The at least one actuating unit can for example be a spring mount adjustment, adjustable dampers, a path adjustment between wheel and superstructure and combinations of the aforementioned components.

Of course, the aforementioned features and the features explained in the following may not only be used in the described combinations but also in other combinations or by themselves without departing from the scope of the present invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
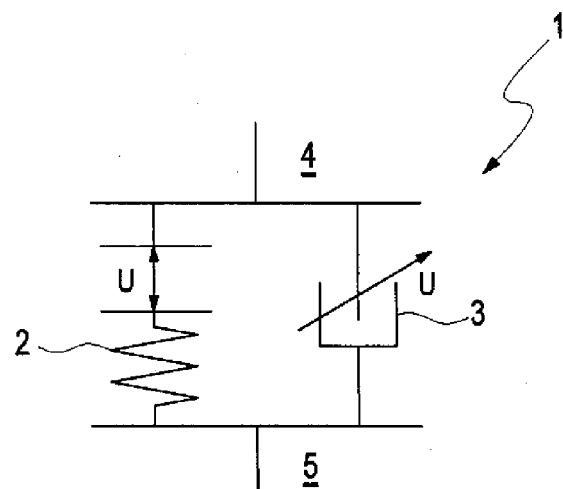
FIG. 1 shows in schematic representation a spring mount adjustment as exemplary actuating unit.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1 there is shown an exemplary spring mount adjustment with adjustable damper, as a possible actuating unit for an embodiment of the method according to the invention. Shown is a spring mount adjustment 1 with a suspension spring 2 and an adjustable damper 3, which are both arranged between a vehicle body 4 and a wheel 5. The adjustable damper can for example be a continuously adjustable hydraulic vibration damper. This spring mount adjustment 1 is controlled by means of a here not shown sensor unit i.e., on the basis of a height profile proactively determined by the sensor unit i.e., before driving over an actual obstacle of a driving course which lies ahead in driving direction of the motor vehicle and which is displayed in the height profile. For this, the height profile of the driving course which lies ahead in driving direction of the motor vehicle is determined by means of the here not shown sensor unit, and an obstacle of the course which is displayed in the determined height profile is assigned to one of multiple predefined and stored categories based on a geometric shape of the actual obstacle. On the basis of the category assigned to the actual obstacle, the control unit transmits a predetermined control signal to the spring mount adjustment 1 which changes the height of the wheel i.e., its distance to the support or to the superstructure or to the vehicle body 4 corresponding to the control signal in.

Figure 2:
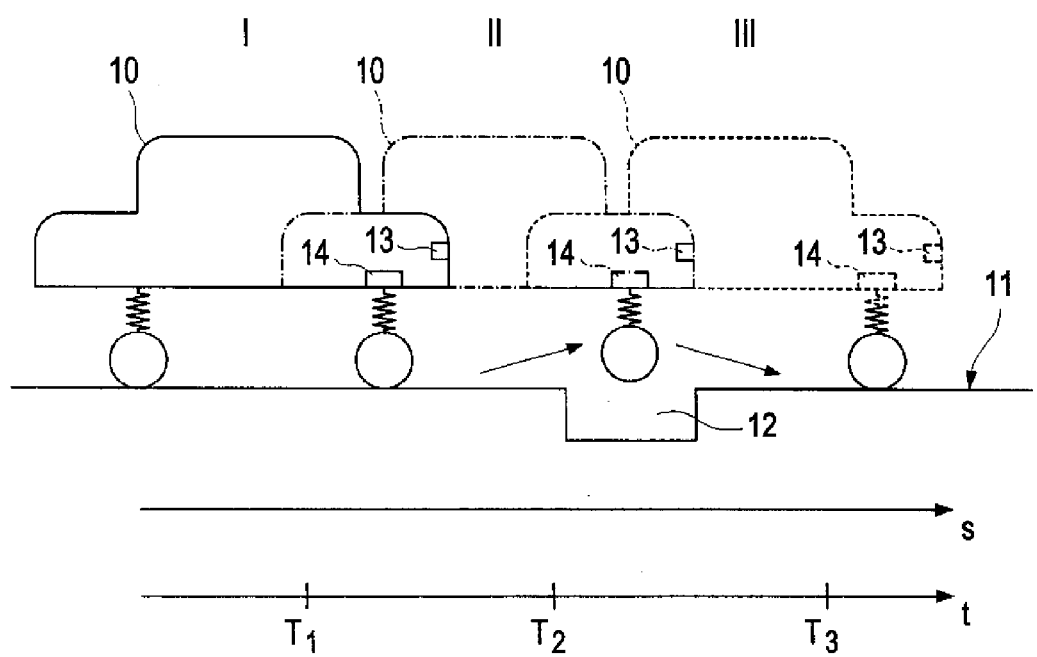
FIG. 2 shows in a schematic representation an application of an embodiment of the method according to the invention.

FIG. 2 shows a schematic representation of a motor vehicle 10, in which an embodiment of the device according to the invention is provided for implementing an embodiment of the method according to the invention.

Shown is a motor vehicle 10 which drives on a driving course 11. The driving course 11 includes a pothole 12, which is to be driven over by the vehicle 10. At a time point $T_1$, the vehicle is positioned at a position I still before the pothole 12. This means that the pothole 12 is located on a driving course, which lies ahead in driving direction of the vehicle. In the motor vehicle 10, a sensor unit 13 is arranged, which determines a height profile of the driving course 11, which lies ahead in driving direction of the vehicle. The actual obstacle i.e., here the pothole 12 is displayed i.e., recognized in the height profile determined by the sensor unit 13. The determined height profile is transmitted to a here not shown control unit of the vehicle 10. Based on the geometric shape of the pothole 12 and its position within the height profile i.e., for example whether it is a one-sided or a center pothole it is assigned to one of the multiple predefined stored categories by the control unit. On the basis of the assigned category, a control signal which is predetermined by the control unit and is assigned to the corresponding category is retrieved from a memory unit which is accessible by the control unit and transmitted to at least one actuator unit 14, for example a spring mount adjustment of the motor vehicle shown in FIG. 1. It is important in this context that this control signal is transmitted by the control unit to the actuating unit 14 before the vehicle drives over the respective obstacle here the pothole, so that the actuating unit 14 is already active prior to reaching the pothole and thus at a time point $T_2$ as indicated by the dash-dotted line in position II of the motor vehicle 10, has the ability to lift wheels or for example in case of a one-sided pothole only one wheel i.e., the one that passed over the pothole, so that the motor vehicle drives over the region in which the pothole is located quasi on three wheels so that the respective wheel due to its being lifted up by the actuating unit 14 i.e., the spring mount adjustment does not abruptly descend into the pothole but is rather retracted in an appropriate manner shortly prior to the pothole, and at a time point $T_3$ after the porthole as shown by the dashed line is lowered to onto the road again. Thus, the respective actuating unit, here a spring mount adjustment of the motor vehicle, is proactively controlled by the control unit. The actuating unit can be a spring mount adjustment as shown in FIG. 1, an adjustable damper, which varies a damping constant, or both in combination. The actuating unit can also be a path adjustment between wheel and superstructure or vehicle body for example by means of linear drives. Further, the retrievable control signal, which is assigned to a respective category, can be adjusted by the control unit to the exact geometry of the actual obstacle in dependence on the concrete actual obstacle and with this be quasi accurately optimized to the actual obstacle. Of course, in the proactive control of the at least one actuating unit, the reaction time of the actuating unit, the actual speed of the motor vehicle and the distance to the pothole at the time point of the control have to be taken into account so that the corresponding wheel is controlled correspondingly exactly when reaching and driving over the obstacle.

The short-time controlled lifting of a respective wheel which lifting is adjusted to the size of the pothole in the case of a one-sided pothole and the controlled slow lowering of the wheel after driving over the portable results in a strong damping compared to directly driving over the pothole so that the pothole is not perceived as unpleasant as such by the driver because although the motor vehicle is slightly lowered on the respective side of the pothole, this process only proceeds very slowly, whereas when directly driving over a pothole the motor vehicle abruptly dips into the pothole over a sharp edge which is perceived as very unpleasant by the driver and in addition can cause damage to the motor vehicle.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method for operating an at least semi-active chassis of a vehicle, comprising:
   determining with at least one sensor unit a height-profile of a road course which lies ahead in a driving direction of the vehicle;
   predefining multiple categories representative of respective potential obstacles that may be present on the road course as a function of respective geometric shapes of the potential obstacles, and storing the multiple categories;
   assigning an actual obstacle of the road course which is displayed in the height profile to one of the multiple predefined and stored categories as a function of a geometric shape of the actual obstacle; and
   proactively controlling with a control unit at least one actuating unit of the motor vehicle by transmitting to the at least one actuating unit a predetermined control signal assigned to the one of the multiple categories, thereby causing actuation of the actuating unit commensurate with the predetermined control signal, said predetermined control signal being calculated as a function of the respective potential obstacles of the predefined categories.

2. The method of claim 1, wherein the chassis is constructed as active chassis.

3. The method of claim 1, further comprising adjusting the predetermined control signal as a function of the geometric shape of the actual obstacle.

4. The method of claim 1, further comprising displaying the chassis of the vehicle in a virtual vehicle model, and simulating an effect of controlling the actuator by the actuating signal on the vehicle when driving over the actual obstacle, and in response thereto modifying the control of the actuator in response to the simulation so that at least one predeterminable criteria is satisfied, wherein by way of a simulation optimal actuating values are calculated to optimally compensating the actual obstacle.

5. The method of claim 1, wherein the at least one actuating unit is selected from at least one member of the group consisting of a spring mount, an adjustable damper, and a path adjustment between wheel and superstructure.

6. The method of claim 1, wherein the actual obstacle is an elevation on the road course, and wherein the proactively controlling of the at least one actuating unit causes a proactive lifting of the vehicle prior to driving over the elevation.

7. The method of claim 1, wherein the actual obstacle is an elevation on the road course, and wherein the proactively controlling of the at least one actuating unit causes a proactive retraction of wheels of the motor vehicle prior to driving over the elevation.

8. The method of claim 1, wherein the actual obstacle is a pothole on the road course, and wherein the proactively controlling of the at least one actuating unit causes a proactive one-sided retraction or lifting of front wheels and/or rear wheels of the vehicle when driving over the pothole.

9. A device for operating an at least semi-active chassis of a vehicle, said device comprising:
   at least one sensor unit, configured to determine a height-profile of a driving course which lies ahead of the vehicle in a driving direction of the vehicle;
   at least one actuating unit;
   a control unit; and
   a classification module coupled with the control unit and configured to establish and store multiple categories of respective potential obstacles which may be present on the driving course as a function of a respective geometric shape of the potential obstacles, and to assign a predetermined control signal to each of the multiple categories,
   wherein the at least one sensor unit is configured to transmit the determined height profile to the control unit, and wherein the control unit is configured to proactively control the at least one actuating unit as a function of the determined height-profile by assigning an actual obstacle of the road course displayed in the determined height-profile to one of the multiple categories and transmitting the predetermined control signal assigned to the one of the categories to the at least one actuating unit, said respective predetermined control can being calculated as a function of the obstacles classified into the respective category.

10. The device of claim 9, wherein the actuating unit is coupled with the control unit and configured to execute the predetermined control signal transmitted by the control unit.

11. The device of claim 9 wherein the chassis is constructed as active chassis.

12. The device of the claim 9, further comprising a calculating unit coupled with the control unit, said calculating unit being configured to display the chassis in a virtual vehicle model and to simulate an effect of the control of the actuator by the actuating signal on the vehicle when driving over the actual obstacle, and to modify the control of the actuator in response to the simulation so that at least one predetermined criteria is satisfied, wherein the simulation enables calculation of optimal actuating values to thereby optimally compensate the actual obstacle.

13. The device of claim 12, wherein the calculating unit is part of the control unit.

14. The device of claim 9, wherein the classification module is part of the control unit.

15. The device of claim 9, wherein the at least one actuating unit is selected from at least one member of the group consisting of spring mount, adjustable damper, and path adjustment between wheel and superstructure.

\* \* \* \* \*